United States Patent
Nishijima et al.

(10) Patent No.: US 6,200,555 B1
(45) Date of Patent: Mar. 13, 2001

(54) DEODORANT COMPOSITION, DEODORIZER AND FILTER EACH CONTAINING THE SAME, AND METHOD OF DEODORIZATION

(75) Inventors: Tsuyoshi Nishijima; Taeko Shimizu; Keiko Matsui, all of Hiroshima-Ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/437,298

(22) Filed: Nov. 9, 1999

(30) Foreign Application Priority Data

Mar. 10, 1998 (JP) .................................................. 10-58586
Sep. 25, 1998 (JP) ................................................. 10-271386

(51) Int. Cl.⁷ ................................. A61L 9/00; A61L 9/01
(52) U.S. Cl. ....................... 424/76.1; 424/76.2; 424/76.3; 424/76.4; 424/76.21
(58) Field of Search ................................. 424/76.1, 76.2, 424/76.21, 76.3, 76.4

(56) References Cited

FOREIGN PATENT DOCUMENTS

| | | | |
|---|---|---|---|
| 60-166020 A | * | 8/1985 | (JP) . |
| 61-168835 | * | 10/1986 | (JP) . |
| 62-286464 | * | 12/1987 | (JP) . |
| 3-46342 | * | 4/1991 | (JP) . |
| 04008660 | * | 1/1992 | (JP) . |
| 7-59837 | * | 3/1995 | (JP) . |
| 09313828 | * | 9/1997 | (JP) . |

* cited by examiner

*Primary Examiner*—Shelly A. Dodson
(74) *Attorney, Agent, or Firm*—Nixon Peabody LLP; Donald R. Studebaker

(57) ABSTRACT

The present invention relates to a deodorant composition capable of removing an odor component such as a carbonyl group-containing compound with high efficiency. The composition includes a deodorizing compound which itself creates no problem of odor and corrosion. The present invention also relates to a deodorizer and filter containing the composition which are compact in size and can remove the odor component in a simple manner, and a method of deodorization using the composition.

The deodorant composition includes the compound reactive with the odor component in the presence of moisture, and a water-absorbing substance. The odor component is a carbonyl group-containing compound. The deodorizing compound reactive with the odor component is at least one selected from the group consisting of monohydric phenols, polyhydric phenols, and derivatives thereof, and among them, resorcin is preferable.

26 Claims, 2 Drawing Sheets

DEODORANT COMPOSITION, DEODORIZER AND FILTER EACH CONTAINING THE SAME, AND METHOD OF DEODORIZATION

CROSS-REFERENCES TO RELATED APPLICATIONS

This is a continuation of International Application PCT/JP98/04594, with an international filing date of Oct. 12,1998.

BACKGROUND OF THE INVENTION (1) Field of the Invention

The present invention relates to a deodorant composition capable of easily and efficiently removing an odor component containing a compound having a carbonyl group such as aldehydes and ketones, thereby achieving deodorization, a deodorizer and filter containing the same, and a method of deodorization using the same. The technique of the present invention is especially effective in removing the odor component from a room of car, house and building.

(2) Description of the Prior Art

At large equipment such as sewage treatment plants and thermal disposal plants in urban areas, odor components are removed from gases by use of sprinkler system cleaning device which uses washing water prepared by dissolving medicine reactive with odor components into water. At small and closed spaces such as toilets, rooms of houses and buildings, and rooms of vehicles, it is impossible to install a large-scale sprinkle system cleaning device. In these spaces, therefore, odor components are usually removed by use of physical adsorbents such as an activated charcoal.

It is confirmed that, in an inter space of a vehicle such as a car, there are odor compound having a carbonyl group such as formaldehyde acetaldehyde, acrolein, and benzaldehyde, as malodorous components generated from decomposed gases of fuels and oils, combustion products from cigarettes, adhesives used for adhesion of interior boards and interior parts of vehicles, and heat insulating foamed resins. In rooms of houses and buildings, there are malodorous components of the same types as those in the vehicle evaporated from heat insulating materials, plywood, and adhesives, and derived from combustion products from cigarettes. In a conventionally known method, these odor components are adsorbed and removed by mounting a member filled with an activated charcoal to an air-cleaner in the room.

The present inventors have found that a physical adsorbent such as an activated charcoal has the following problems. In one problem, although the physical adsorbent exhibits a relatively high ability of adsorbing and removing odor components if the components have high adsorptive property, it has almost no ability of adsorbing and removing a carbonyl group-containing compound. The other problem of the physical adsorbent is as follows. The physical adsorbent such as an activated charcoal conducts deodorization by capturing the odor components into its adsorption sites. When the adsorption sites are saturated with the odor components, the odor components cannot be adsorbed any more. At the same time, the physical adsorbent also adsorbs moisture (i.e. water) In the gas together with the odor components. If the adsorption sites are saturated with the moisture, the odor components cannot be adsorbed any more. The air in the rooms of houses, buildings, and cars contains a large amount of moisture. When used in such rooms, the physical adsorbent adsorbs the moisture and is saturated in a very short time, and as a result, loses its ability of adsorbing odor components.

Japanese Laid Open Patent Publication No. Hei 9-313828 discloses a filter for cleaning the air by removing aldehyde therefrom. The filter is formed with a carrier such as an activated charcoal for carrying a medicine for removing aldehyde. However the medicine is an amine or ammonia compound, and has the problems in use because the medicine itself smells, generates acidic ions which are highly corrosive, or sublimates. Specifically, the following compounds are disclosed as the medicine, but have disadvantages as follows. Triethanolamine, pyrdine, and hexamethylenetetramine have irritating smell like ammonia at a room temperature. Casein, casein sodium, and glycine gives out odor at a room temperature. Urea and thiourea smells bad at a high temperature (80 to 100° C.), and the smell becomes stronger in the presence of moisture. Amine or ammonia salts, also disclosed in the prior art application, have no problem of odor; however, they dissociate by moisture to generate highly corrosive ions (such as ammonium sulfate, and ethylene diamine tetraacetic acid (EDTA)·2Na), liberates acids (such as polyallylamine hydrochloride, aminoguadinine sulfate, guadinine nitrate, and hydroxylamine sulfate). Due to these disadvantages, the amine or ammonia salts can be used in only limited applications. Dimethylhydantoin has no problem of odor and corrosion; however, it sublimates and is not suitable for a deodorant. In the technique disclosed in the prior art application, the medicine for removing aldehyde itself has problems of odor and corrosion.

SUMMARY OF THE INVENTION

The present invention has been conducted in view of the above problems, and the objective thereof is to provide a deodorant composition capable of removing an odor component such as a carbonyl group-containing compound, for example, aldehyde and ketone with high efficiency. The composition uses a deodorizing compound which itself creates no problem of odor and corrosion. Another objective of the present invention is to provide a deodorizer and filter containing the composition which are capable of easily remove the odor component, and are compact in size.

According to an aspect of the present invention which has been achieved the above-described objectives, a deodorant composition includes a deodorizing compound reactive with an odor component in the presence of moisture, and a water-absorbing substance. The odor component is a carbonyl group-containing compound. The deodorizing compound reactive with the odor component is at least one selected from the group consisting of polyhydric phenols, polyhydric phenols, and derivatives thereof, and among them, resorcin is preferable.

DETAILED DESCRIPTION OF THE PREFERRED EMBODIMENTS OF THE INVENTION

Figure 1:
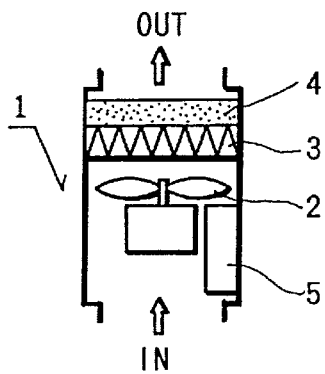
FIG. 1 is a conceptual diagram showing a specific example of a deodorizer of the present invention.

The entire disclosure of Japanese Patent Application No. Hei 10-58586 filed on Mar. 10, 1998 and No. Hei 10-271386 filed on Sep. 25, 1998 including specification, claims, drawings and summary are incorporated herein by references in their entirety.

According to the present invention, a gas to be treated containing a carbonyl group-containing compound as an odor component is chemically reacted with a deodorizing compound in the presence of moisture, thereby removing the odor component from the gas. Specifically, a compound having active hydrogen which has addition reactivity with a carbonyl group is used as the deodorizing compound. The deodorizing compound is at least one selected from the group consisting of monohydric phenols, polyhydric phenols, and derivatives thereof.

The deodorant composition includes the deodorizing compound and a water-absorbing substance, and the deodorizing compound is chemically reacted with the odor component. Through this chemical reaction, the odor component is removed from the gas to be treated. The composition strongly deodorizes the gas with high efficiency, and never releases the odor component which it once adsorbs. In the reaction between the deodorizing compound and the odor component, moisture is required as a reaction medium. The water-absorbing substance absorbs the moisture in the air, and supplies it to the deodorizing compound. The deodorization proceeds in the presence of the moisture supplied from the water-absorbing substance, and there is no need of additionally supplying water. By eliminating the need of supplying additional water, the deodorization can be performed with high efficiency. Unlike the amine or ammonia compounds which have been used for deodorization in the prior arts, the deodorizing compound contained in the composition of the present invention itself does not have an odor, never generates highly corrosive acidic ions, nor sublimates.

The water-absorbing substance is a water-absorbing carrier, and carries the deodorizing compound. It is preferable that the water-absorbing substance carries a weak acidic substance or a weak basic substance together with the deodorizing compound.

As the water-absorbing substance, a water-absorbing inorganic substance and a water-absorbing polymer are preferable. Preferable examples of the water-absorbing inorganic substance include silica gel, zeolite, alumina, and silious earth. Preferable examples of the water-absorbing polymer include polymers or copolymers of acrylates, acrylamides, maleic acids, ethylene oxides, and vinylalcohols, modified starch, and modified cellulose. These may be used alone or in combination of two or more of them if necessary.

According to another aspect of the present invention, a deodorizer includes a member filled with the deodorant composition. In addition the deodorizer may further include a fan for efficiently supplying a gas to be treated to the member filled with the composition, thereby increasing the deodorization efficiency. The deodorizer can be formed into a very compact size, and therefore, is effective in deodorization in the room of house, building, and car. It is recommended as a preferable embodiment of the present invention to mount the deodorizer to an air-conditioner in the room so that the air-conditioning and the deodorization are simultaneously conducted using the air-blower of the air-conditioner. In this case, it is preferable that the deodorant composition is charged into, for example, a cassette so as to be detachable from the apparatus. When the composition is saturated with the odor component and does not perform deodorization any more, it can be exchanged with a new one.

According to still another aspect of the present invention, a filter for use in air cleaning to be mounted to an air-conditioner, which has been achieved the above-described objective of the present invention, includes the composition of the present invention. When it is required for the filter to remove odor components other than carbonyl group-containing compound, it is preferable that the filter further include a physical adsorbent capable of adsorbing the aimed odor components (for example, an activated charcoal), in addition to the composition of the present invention.

According to still another aspect of the present invention, a method of deodorization includes the step of bringing a gas to be treated containing the odor component into contact with the composition of the present invention in the presence of moisture to remove the odor component from the gas.

The deodorizing compound is preferably phenol or a derivative thereof. Specific examples thereof include: monohydric phenols such as hydroxybenzoic acid, eugenol, 3,5-, 2,5-, and 3,4-xylenol; dihydric phenols such as resorcin, bisphenol A, and catechol; trihydric phenols such as pyrogallol, purpurin, and naringin; and tetrahydric phenols such as rutin.

Among them, it is confirmed that rutin is contained in pansy. When the compound contained in a plant is used as the deodorizing compound, it is possible that the compound is extracted from the plant, or the plant is crushed and is mixed with the water-absorbing substance. In this manner, the effect of the present invention can be achieved as well.

Among the above compounds, resorcin, which is a kind of polyhydric phenols, is very preferable as the deodorizing compound, because it exhibits extremely high reactivity with the carbonyl group-containing compound. When resorcin is used together with a weak acidic substance such as oxalic acid or a weak basic substance such as sodium carbonate, higher effect of adsorbing and removing the odor component such as aldehyde can be attained. As a result, the composition has higher ability of deodorization. The reason of this effect is considered that the weak acidic substance and the weak basic substance act as a catalyst for the reaction between resorcin and formaldehyde. The same effect can be sufficiently obtained when monohydric or polyhydric phenol other than resorcin is used as the deodorizing compound.

The water-absorbing substance is not limited to a specific kind as far as it is not reactive with the deodorizing compound and is capable of absorbing moisture in the gas to be treated. Any water-absorbing inorganic substance and water-absorbing polymer may be used as the water-absorbing substance. Preferable examples of the water-absorbing inorganic substance include silica gel, zeolite, alumina, and activated charcoal which are generally used as an inorganic carrier. Zeolite is categorized into Na-type and H-type (i.e. proton type) in accordance with its ion type. When zeolite is used as the water-absorbing substance, the use of H-type zeolite is recommended, because it has high reactivity with aldehyde.

When the deodorizing compound is used together with the weak acidic substance or the weak basic substance as described above, there is a fear that the weak basic substance and the weak basic substance may generate acid and alkaline respectively when they absorb moisture, and the deodorizer and the appliances attached thereto may be corroded by the acid and alkaline. In order to avoid this trouble, it is preferable that the water-absorbing substance is a solid acidic substance such as H-type zeolite or a solid basic substance such as Na-type zeolite. By use of these substances as the water-absorbing substance, the phenol as the deodorizing compound exhibits stronger deodorization activity without problem of acid corrosion and alkali deterioration.

Examples of the water-absorbing polymer include polymers or copolymers of acrylates, acrylamides, maleic acids, ethylene oxides, and vinyl alcohols, as well as modified starch and modified cellulose. More preferable examples thereof include polyacrylate, copolymers of acrylic acid and vinyl alcohol or acrylic acid ester or the salt thereof, polymers of acrylamides, polyethylene oxide, salt of copolymers of maleic acid and isobutylene, and graft modified acrylate of starch or carboxy cellulose. These may be used alone or in combination of two or more of them if necessary.

When the water-absorbing inorganic substance is used as the water-absorbing substance, it is usually used in the form of granules in order that the air-flow resistance at the time when the gas to be treated is passes through the composition is suppressed to low. In some cases, the water-absorbing inorganic substance may be formed into the shape of a honeycomb, a porous plate, or a block. When the water-absorbing polymer is used as the water-absorbing substance, it is usually used in the form of granules. In some cases, the water-absorbing polymer is formed into the shape of a porous sheet, or a non-woven cloth or textile if it can be made into fiber.

The deodorant composition of the present invention can be produced by the following methods. In one method, when the deodorizing compound is in the liquid state, the deodorizing compound is directly absorbed and carried by the water-absorbing substance. In another method, when the deodorizing compound is in the solid state, it is dissolved into a proper solvent such as methanol, and the obtained solution is absorbed so that the deodorizing compound is carried by the water-absorbing substance together with water. Then, the resultant is heated at a proper temperature. In still another method, the water-absorbing substance and the deodorizing compound are crushed and mixed with each other. If necessary, the mixture is formed into the shape of pellet, granule, or tablet.

The ratio of the use amount between the water-absorbing substance and the deodorizing compound is not specifically limited, and is properly determined taking into consideration the deodorization activity of the deodorizing compound, carrying amount when it is saturated, and deodorization ability required for it. It is usually preferable that 1 to 50 g of the deodorizing compound is used with respect to 100 g of water-absorbing substance. As described above, the water-absorbing substance absorbs moisture in the gas to be treated. When the deodorizing compound reacts with the odor component, the moisture as a medium of reaction is supplied from the water-absorbing substance. In expectation of the moisture from the water-absorbing substance, it is possible that substantially no extra water is added to the composition at the initial stage of deodorization treatment. If extremely strong deodorization is required from the very beginning of the deodorization treatment, it is preferable to add a proper amount of water to the water-absorbing substance before the deodorization treatment is started.

There are the following methods for allowing the water-absorbing substance as a carrier to carry the deodorizing compound: 1) the water-absorbing substance as a carrier is mixed with the deodorizing compound, and is further mixed with some amount of binder. The mixture is preliminarily formed into grains, and then is mixed with a specific amount of binder. Then, the mixture is formed into the aimed grains; 2) the water-absorbing substance as a carrier, the deodorizing compound, and the binder are simultaneously mixed with each other, and the mixture is formed into grains; and 3) the water-absorbing substance as a carrier is mixed with the binder and the mixture is formed into grains. The grains are soaked into an aqueous solution or an alcohol solution of the deodorizing compound, and as a result, the grains of the water-absorbing substance carry the deodorizing compound. As the method for forming the grains, any known methods may be employed such as extrusion molding and high speed mixing granulation.

As the binder, any known binders may be used. Preferable is a water-soluble binder such as polyvinyl alcohol (PVA). The lower limit of the amount of the binder is preferably 1 percent, and more preferably 3 percent. If the amount of the binder is too small, the formation of grains becomes difficult. Contrary to this, the upper limit of the amount of the binder is preferably 50 percent, and more preferably 20 percent. If the amount of the binder is too large, the deodorization ability of the composition is lowered.

By use of the composition of the present invention, the deodorizing compound contained in the composition together with the water-absorbing substance reacts with the odor component in the presence of moisture, and captures the odor component and changes it into an odorless component. The deodorization is proceeded with high efficiency. Examples of the odor component to be removed are aldehydes such as formaldehyde, acetaldehyde, acrolein, and benzaldehyde.

The deodorant composition is charged into a proper member, for example, a vessel, and the gas to be treated is passed therethrough. The composition in the vessel efficiently removes the odor component from the gas, and purifies the gas into a harmless and odorless gas. It is preferable that a fan is placed at a proper position in front or in the rear of the member filled with the composition. By operating the fan, the gas to be treated is smoothly introduced to the member filled with the composition. The efficiency of deodorization is enhanced by adjusting the rotation speed of the fan to a proper level in accordance with the concentration of the odor component in the gas. It is preferable that the member filled with the composition is placed at a proper position in front or in the rear of the air-conditioner installed in a room of house, building, and car, because the fan of the air-conditioner can be used for deodorization as well.

The deodorizer with a fan may be mounted on a ceiling or behind the rear seat in a vehicle. The air in the car is deodorized while being circulated by the fan. It is preferable to combine the member filled with the composition and the filter for dust removal into one piece unit. It is also preferable that the filter for dust removal is placed in front or in the rear of the member filled with the composition in a direction along which the air is sent, so that the deodorization and dust removal can be conducted simultaneously.

Figure 2:
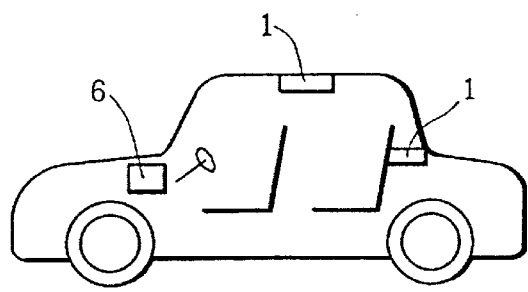
FIG. 2 is an explanatory diagram showing a position to which the deodorizer is to be mounted in a vehicle.

FIG. 1 is a conceptual diagram showing an example of a deodorizer in a circulation system. In the deodorizer, a purifier 1 includes a fan 2 for sending air, and a filter 3 for dust removal and a deodorization part 4 placed in this or de r o n the downstream side of the fan 2. The fan 2 is rotated to suck the gas to be treated into the purifier 1, and the gas is passed through the dust removal filter 3 and the deodorization part 4 to remove the dust and the odor component from the gas. In FIG. 1, the reference numeral 5 denotes a sensor. The sensor 5 detects the degree of contamination of the gas to be treated. The sensor 5 automatically detects whether or not the contamination of the gas reaches a specified level, and if it reaches the specific level, the fan 2 is started. By mounting the purifier 1 structured as described above on a ceiling or on a backside of the rear seat of a vehicle as shown in FIG. 2 for example, the air in the vehicle is always kept to be clean.

Figure 3:
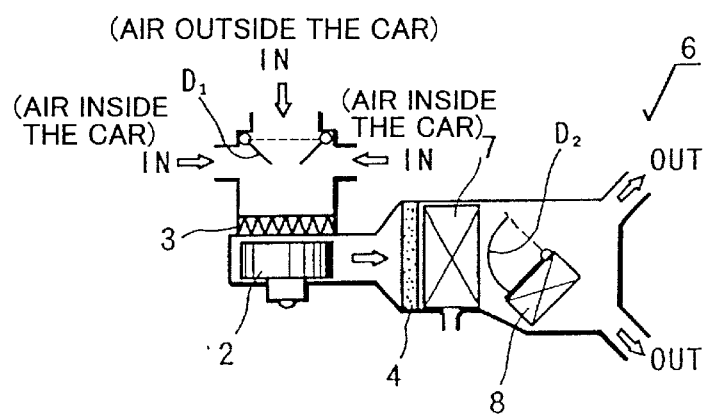
FIG. 3 is an explanatory diagram showing a state where the deodorizer of the present invention is mounted to an air-conditioner of car.

FIG. 3 is a conceptual diagram showing the case where the deodorizer of the present invention is mounted to an air-conditioner 6 in a vehicle. When a fan 2 is started, the air outside the vehicle or the air inside the vehicle is introduced into the air-conditioner 6. The air is passed through the dust removal filter 3, a deodorizing part 4, and an evaporator 7 in this order to be purified. The purified air is supplied into the vehicle. In FIG. 3, the reference numeral 8 denotes a heater unit, and $D_1$, $D_2$ switching dampers, respectively. Thus-structured air-conditioner 6 is usually mounted to a front area inside the vehicle as shown in FIG. 2.

The deodorant composition of the present invention is chemically reacted with the odor component to remove the odor component from the gas to be treated. With the elapse of the time, the deodorization activity of the composition is gradually lowered. When the entire deodorizing compound in the composition is consumed in the reaction with the odor component, the composition loses its deodorization activity. It is recommended as a preferable embodiment of the present invention for putting the composition into practical use that the composition is charged into a detachable cassette, so that the cassette is attached to and detached from the part where deodorization treatment is conducted by way of one-touch operation. When the composition loses its deodorization activity, the cassette can be easily exchanged for a new one.

The composition can be contained in the filter by the following methods for example. In one method, the composition formed into the shape of grains is interposed between filter materials such as non-woven cloth and electrostatic paper to form the filter. In another method, the water-absorbing substance as a carrier, the deodorizing compound, and the binder are mixed with each other, and the mixture is dissolved into a solution. Into the solution of the mixture, a filter material such as non-woven cloth is soaked, and then is dried. The resultant filter directly carries the composition.

Figure 4A:
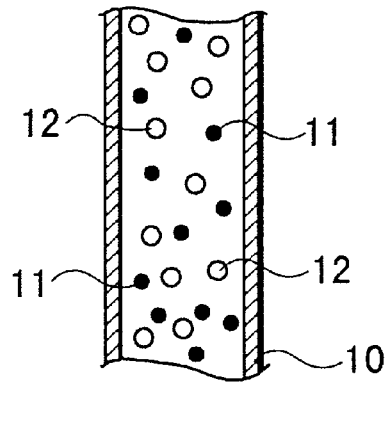
FIG. 4 is an explanatory diagram showing an example of a filter of the present invention (containing an activated charcoal together with the deodorant composition).
Figure 4B:
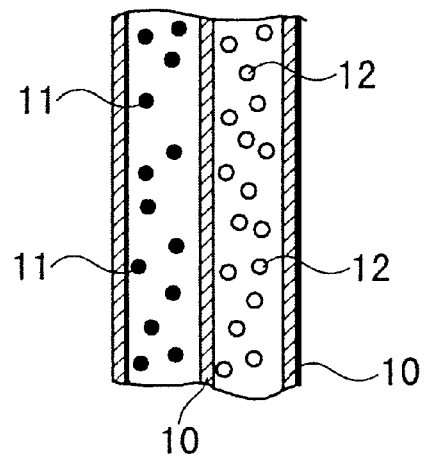

In the deodorization of a gas containing the mixed odor of aldehyde and the exhaust gas from a car, smoke of cigarette, and the exhaust gas from an oil heater, the composition is preferably used together with a physical adsorbent such as an activated charcoal. As shown in FIG. 4A, the mixture of an activated charcoal 11 and the deodorant composition 12 is interposed between filter materials 10 such as non-woven cloth and an electrostatic paper. Alternatively, as shown in FIG. 4B, a layer of the activated charcoal 11, and a layer of the deodorant composition 12 are formed in adjacent to each other via a filter material 10.

The deodorant composition of the present invention is used in the deodorizer and filter through which the gas to be treated is forcibly passed (passing-style deodorization). Alternatively, the composition also can be used in building materials, wall paper, and ornaments. In these applications, the composition is carried on the surface thereof, and is naturally in contact with the gas and removes the odor components therefrom (contact-style deodorization).

As described above, by use of the deodorant composition of the present invention and the method of deodorization using the composition, the odor component can be removed in a simple manner with high efficiency. The deodorizer and the filter containing the composition is compact in size and has high efficiency of deodorization.

Hereinafter, he present invention will be further described by way of examples. However, it is to be noted that various changes and modifications will be apparent to those skilled in the art. Therefore, unless otherwise such changes and modifications depart from the scope of the invention, they should be construed as being included therein.

EXAMPLES

Example 1

Figure 5:
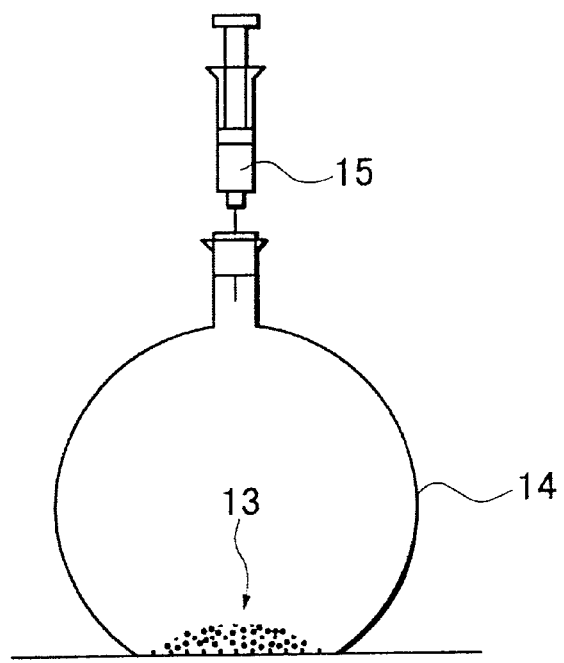
FIG. 5 is an explanatory diagram showing a system for conducting the test for evaluating the deodorization performance.

As shown in FIG. 5, each type of deodorant 13, prepared by the following methods respectively, was put into a flask 14 having a capacity of 1000 cc. Into the flask, acetaldehyde was injected with a syringe 15 so that the acetaldehyde concentration inside the flask became 1000 ppm, and the flask was hermetically sealed. The flask was left for 1 hour at 20 to 30° C., and after that, the rate of removing the acetaldehyde [rate of deodorization (%)] was measured. The results of the measurement are shown in Table 1.

[Preparation of deodorant]

Deodorant A: 1 g of Eugenol and 10 g of silica gel (an average particle diameter: 0.05 to 0.2 mm) were crushed together and mixed with each other to prepare a deodorant A in the form of powder having an average particle diameter of 5 to 50 µm.

Deodorant B: 1 g of 3,5-xylenol and 10 g of silica gel of the same type as that used for preparing the deodorant A were crushed together and mixed with each other to prepare a deodorant B in the form of powder having an average particle diameter of 5 to 50 µm.

Deodorant C: 1 g of Resorcin and 10 g of silica gel of the same type as that used for preparing the deodorant A were crushed together and mixed with each other to prepare a deodorant C in the form of powder having an average particle diameter of 5 to 50 µm.

Deodorant D: 1 g of pyrogallol and log of silica gel of the same type as that used for preparing the deodorant A were crushed together and mixed with each other to prepare a deodorant D in the form of powder having an average particle diameter of 5 to 50 µm.

TABLE 1

|  | Deodorizing compound | Water-absorbing substance | Rate of deodorization (%) |
| --- | --- | --- | --- |
| Deodorant A | Eugenol | Silica gel | 89 |
| Deodorant B | 3,5-xylenol | Silica gel | 82 |
| Deodorant C | Resorcin | Silica gel | 80 |
| Deodorant D | Pyrogallol | SIlica gel | 84 |

The deodorants A to D satisfied the requirements of the present invention. As seen in Table 1, all the deodorants A to D showed an excellent deodorization performance.

Example 2

Deodorants E to H were prepared using resorcin as a deodorizing compound, as was the case of preparing the deodorant C in Example 1. The rates of deodorization were measured for the respective deodorants E to H by employing the same steps of Example 1. The results of the measurements are shown in Table 2.

[Preparation of adsorbent]

Deodorant E: 1 g of resorcin, 0.2 g of oxalic acid, and 10 g of silica gel of the same type as that used in Example 1 were crushed together and mixed with each other to prepare a deodorant E in the form of powder having an average particle diameter of 5 to 50 $\mu$m.

Deodorant F: 1 g of resorcin, 0.2 g of sodium carbonate, and 10 g of silica gel of the same type as that used in Example 1 were crushed together and mixed with each other. The mixture was formed into tablets to prepare a deodorant F in the form of tablets having the same size with each other.

Deodorant G: 1 g of resorcin, and 10 g of H- and ZSM5-type zeolite (silica-alumina ratio: $SiO_2/Al_2O_3$ (molar ratio)=75, an average grain diameter of 5 to 10 $\mu$m) were mixed with each other and stirred together. The mixture was formed into tablets to prepare a deodorant G in the form of tablets having the same size with each other.

Deodorant H: 1 g of resorcin, and 10 g of Na-type zeolite (an average particle diameter of 5 to 10 $\mu$m) were mixed with each other and stirred together. The mixture was formed into tablets to prepare a deodorant H in the form of tablets having the same size with each other.

TABLE 2

|  | Deodorizing compound | Water-absorbing substance | Rate of deodorization (%) |
| --- | --- | --- | --- |
| Deodorant C | Resorcin | Silica gel | 80 |
| Deodorant E | Resorcin + oxalic acid | SIlica gel | 98 |
| Deodorant F | Resorcin + sodium carbonate | Silica gel | 89 |
| Deodorant G | Reorcin | H-type zeolite | 99 |
| Deodorant H | Resorcin | Na-type zeolite | 88 |

As seen in Table 2, the deodorants containing a small amount of the weak acidic substance or weak basic substance together with resorcin had increased ability of deodorization, and in particular, the deodorants containing the weak acidic substance showed remarkably strong deodorization. However, there is a demerit that the weak acidic substance and the weak basic substance release acid or alkaline when they absorb moisture in the air, and cause a problem that the equipment is corroded by the acid or alkaline, or impaired by the alkaline. This problem can be avoided by using a solid acidic substance and a solid basic substance such as H-type zeolite or Na-type zeolite as carriers.

Example 3

As polyhydric phenol, 1 g of catechol, purpurin, naringin, and rutin were prepared respectively. Each of them was mixed with 10 g of H-type zeolite (as was used for preparing the deodorant G) and stirred together. The respective mixtures were formed into tablets to prepare deodorants I to L in the form of tablets having the same size with each other. Repeating the steps of Example 1, the rates of deodorization were measured for the deodorants I to L.

The results of the measurements are shown in Table 3. As seen in Table 3, all the deodorants I to L showed high rate of deodorization.

TABLE 3

|  | Deodorizing compound | Water-absorbing substance | Rate of deodorization (%) |
| --- | --- | --- | --- |
| Deodorant I | Catechol | H-type zeolite | 80 |
| Deodorant J | Purpurin | H-type zeolite | 77 |
| Deodorant K | Naringin | H-type zeolite | 80 |
| Deodorant L | Rutin | H-type zeolite | 82 |

According to the present, invention, the deodorant composition can deodorize a gas to be treated by removing an odor component such as a carbonyl group-containing compound from the gas with high efficiency. The deodorizing compound contained in the composition has no problem of odor and corrosion. In addition, the deodorizer and the filter containing the composition are compact in size and remove the odor component in a simple manner. The method of deodorization using the composition can remove the odor component from the gas in a simple manner with high efficiency. According to the present invention, the composition exhibits very strong and stable deodorization even when it is incorporated into the deodorizer compact in size. Therefore, the composition is particularly effective in deodorization in a room of car, house, and building.

What is claimed is:

1. A deodorant composition comprising a deodorizing compound chemically reactive with an odor component in the presence of moisture, and a water-absorbing substance, wherein the odor component is a compound having a carbonyl group;

the deodorizing compound is at least one selected from the group consisting of monohydric phenols, polyhydric phenols, and derivatives thereof; and the water-absorbing substance is a water-absorbing carrier for carrying the deodorizing compound and absorbs moisture in a gas to be treated containing the odor component, and supplies the absorbed moisture to the deodorizing compound so that the moisture is used as a medium for reaction between the odor component and the deodorizing compound.

2. A deodorant composition according to claim 1, wherein the deodorizing compound is odorless polyhydric phenol or derivatives thereof.

3. A deodorant composition according to claim 2, wherein the deodorizing compound is at least one selected from the group consisting of resorcin, purpurin, naringin, rutin, and derivatives thereof.

4. A deodorant composition according to claim 1, wherein the water-absorbing substance as the water-absorbing carrier is at least one selected from the group consisting of a water-absorbing inorganic substance and a water-absorbing polymer.

5. A deodorant composition according to claim 4, wherein the water-absorbing inorganic substance is at least one selected from the group consisting of silica gel, zeolite, and silious earth.

6. A deodorant composition according to claim 5, wherein the water-absorbing inorganic substance is zeolite H or zeolite Na.

7. A deodorant composition according to claim 4, wherein the water-absorbing polymer is at least one selected from the group consisting of polymers or copolymers of acrylates, acrylamides, maleic acids, ethylene oxides, and vinyl alcohols, as well as modified starch and modified cellulose.

8. A deodorant composition comprising a deodorizing compound chemically reactive with an odor component in the presence of moisture, and a water-absorbing substance, wherein the odor component is a compound having a carbonyl group;

the deodorizing compound is at least one selected from the group consisting of monohydric phenols, polyhydric phenols, and derivatives thereof; and the water-absorbing substance is a solid acidic substance.

9. A deodorant composition according to claim 8, wherein the solid acidic substance is zeolite H or zeolite Na.

10. A deodorant composition according to claim 8, wherein the deodorizing compound is odorless polyhydric phenol or a derivative thereof.

11. A deodorant composition comprising a deodorizing compound chemically reactive with an odor component in the presence of moisture, and a water-absorbing substance, wherein the odor component is a compound having a carbonyl group; and the deodorizing compound is at least one selected from the group consisting of odorless polyhydric phenols and derivatives thereof.

12. A deodorant composition comprising a deodorizing compound chemically reactive with an odor component in the presence of moisture, and a water-absorbing substance, wherein the odor component is a compound having a carbonyl group;

the deodorizing compound is resorcin; and the water-absorbing substance is zeolite.

13. A deodorant composition according to claim 12, wherein the zeolite is or zeolite H or zeolite Na.

14. A deodorant composition comprising a deodorizing compound chemically reactive with an odor component in the presence of moisture, and a water-absorbing substance, wherein the odor component is a compound having a carbonyl group;

the deodorizing compound is at least one selected from the group consisting of monohydric phenols, polyhydric phenols, or derivatives thereof; and the water-absorbing substance absorbs moisture in a gas to be treated containing the odor component, and supplies the moisture to the deodorizing compound as a medium for reaction between the odor component and the deodorizing compound.

15. A deodorant composition according to claim 14, wherein the deodorizing compound is odorless polyhydric phenol.

16. A deodorant composition according to claim 15, wherein the deodorizing compound is at least one selected from the group consisting of resorcin, purpurin, naringin, rutin, and derivatives thereof.

17. A deodorant composition according to claim 11, wherein the water-absorbing substance is at least one selected from the group consisting of silica gel, zeolite, and silious earth.

18. A deodorant composition according to claim 11, wherein the water-absorbing substance is at least one selected from the group consisting of polymers or copolymers of acrylates, acrylamides, maleic acids, ethylene oxides, and vinyl alcohols, as well as modified starch and modified cellulose.

19. A deodorant composition according to claim 11, wherein the odor component is aldehyde.

20. A deodorant composition according to claim 11, wherein the composition is used for deodorization in a vehicle.

21. A deodorizer comprising a member filled with the deodorant composition of claim 11, and a fan for supplying a gas to be treated to the member filled with the composition.

22. A deodorizer according to claim 21, wherein the deodorizer is to be mounted to an air-conditioner.

23. A filter for air-cleaning comprising the deodorant composition of claim 11.

24. A filter according to claim 23, further comprising a physical adsorbent for adsorbing the odor component.

25. A filter according to claim 24, wherein the physical adsorbent is an activated charcoal.

26. A method for deodorization comprising the step of bringing a gas to be treated containing an odor component into contact with the deodorant composition of claim 11 in the presence of moisture to remove the odor component from the gas.

* * * * *

UNITED STATES PATENT AND TRADEMARK OFFICE
CERTIFICATE OF CORRECTION

PATENT NO. : 6,200,555 B1
DATED : March 13, 2001
INVENTOR(S) : Tsuyoshi Nishijima et al.

It is certified that error appears in the above-identified patent and that said Letters Patent is hereby corrected as shown below:

<u>Title page,</u>
Related Applications,
Line 3, please add -- , now abandoned -- after "1998"

Signed and Sealed this

Twenty-sixth Day of March, 2002

*Attest:*

*Attesting Officer*

JAMES E. ROGAN
*Director of the United States Patent and Trademark Office*